(12) United States Patent
Yan et al.

(10) Patent No.: US 12,387,124 B2
(45) Date of Patent: Aug. 12, 2025

(54) OPTICAL PULSE DESIGN METHOD FOR HIGH-FIDELITY MANIPULATION OVER ENSEMBLE QUBITS

(71) Applicant: SOOCHOW UNIVERSITY, Suzhou (CN)

(72) Inventors: Ying Yan, Suzhou (CN); Ze Mo, Suzhou (CN); Tianfeng Chen, Suzhou (CN); Lin Wan, Suzhou (CN); Jiayi Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 703 days.

(21) Appl. No.: 17/783,373

(22) PCT Filed: Feb. 25, 2021

(86) PCT No.: PCT/CN2021/077813
§ 371 (c)(1),
(2) Date: Jun. 8, 2022

(87) PCT Pub. No.: WO2022/095310
PCT Pub. Date: May 12, 2022

(65) Prior Publication Data
US 2023/0025745 A1 Jan. 26, 2023

(30) Foreign Application Priority Data
Nov. 6, 2020 (CN) .......................... 202011228770.3

(51) Int. Cl.
*G01J 1/42* (2006.01)
*G02F 1/11* (2006.01)
(Continued)

(52) U.S. Cl.
CPC ............ *G06N 10/40* (2022.01); *G01J 1/4257* (2013.01); *G02F 1/11* (2013.01)

(58) Field of Classification Search
CPC ....... G06N 10/40; G06N 10/00; G01J 1/4257; G01J 2001/4238; G02F 1/11
See application file for complete search history.

(56) References Cited

U.S. PATENT DOCUMENTS

| 6,678,450 B1 | 1/2004 | Franson |
| 11,293,851 B2 * | 4/2022 | Cooper-Roy .......... G02B 21/32 |
| 2020/0161446 A1 * | 5/2020 | Anderson .............. B82Y 20/00 |

FOREIGN PATENT DOCUMENTS

| CN | 101477288 A | 7/2009 | |
| CN | 108415206 A * | 8/2018 | ............... G02F 1/33 |

(Continued)

OTHER PUBLICATIONS

CN 108415206 translation.*
Guery-Odelin et al., Shortcuts to adiabaticity: concepts, methods, and applications, Nov. 11, 2019, pp. 1-61 (Year: 2019).*

*Primary Examiner* — Nghia M Doan
(74) *Attorney, Agent, or Firm* — SZDC Law PC

(57) ABSTRACT

The present invention discloses an optical pulse design method for high-fidelity manipulation over ensemble qubits, so that fast and efficient two-color optical pulses that have high robustness against frequency detuning and a laser intensity fluctuation are constructed by using an inverse engineering method based on a Lewis-Riesenfeld invariant, and using a perturbation theory and a concept of a system error sensitivity. The pulses can be applied in an inhomogeneously broadened three-level system to create an arbitrary superposition state of ensemble qubits with a high fidelity. During action of the pulse, quantum manipulation has stronger robustness against instantaneous changes or spatial nonuniform distribution of a laser intensity. The robustness can increase a signal-to-noise ratio of a detected signal and reduce experimental difficulties. In addition, the time that the qubits are in an excited state is significantly (Continued)

reduced, which can greatly reduce a decoherence effect of the qubits and ensure high-fidelity manipulation.

6 Claims, 8 Drawing Sheets

(51) Int. Cl.
    *G06N 10/00*      (2022.01)
    *G06N 10/40*      (2022.01)

(56) References Cited

FOREIGN PATENT DOCUMENTS

| CN | 109782508 A | 5/2019 |
|---|---|---|
| CN | 12232514 A | 1/2021 |

* cited by examiner

OPTICAL PULSE DESIGN METHOD FOR HIGH-FIDELITY MANIPULATION OVER ENSEMBLE QUBITS

This application is the National Stage Application of PCT/CN2021/077813, filed on Feb. 25, 2021, which claims priority to Chinese Patent Application No. 202011228770.3, filed on Nov. 6, 2020, which is incorporated by reference for all purposes as if fully set forth herein.

TECHNICAL FIELD

The present invention relates to the field of quantum manipulation, and in particular, to an optical pulse design theory capable of quickly creating an arbitrary superposition state of ensemble qubits with a high fidelity.

BACKGROUND

Quantum computing mainly follows the laws of quantum mechanics and quantum dynamics. Compared with classical computing, the quantum computing has a faster computing speed and can solve many problems that are difficult to solve in classical computing. Therefore, the quantum computing can be widely used in quantum neural network simulation, artificial intelligence, large prime factorization, unordered database retrieval, etc. The first step towards quantum computing is to quickly initialize qubits to an arbitrary qubit superposition state with a high fidelity. There are many physical carriers of qubits. Therefore, based on characteristics of the systems in which different carriers are located, appropriate optical pulses should be designed to achieve high-fidelity quantum state manipulation, which is of great significance for research and development of quantum computing.

In an inhomogeneously broadened experimental system, qubits are represented by a set of inhomogeneously broadened ions, and different qubits are addressed by different frequency bands. In such a system, when an arbitrary superposition state of qubits is created, quantum manipulation needs to not only have better robustness against frequency detuning caused by inhomogeneous broadening in the ensemble qubits, but also have a strong inhibitory effect on the off-resonant excitation to other ions that sit close by the qubit ions in frequency. In addition, in an experiment, an optical pulse is usually a Gaussian beam, and a laser intensity thereof presents Gaussian distribution in space, rather than uniform distribution. This spatial distribution nonuniformity leads to different optical field intensities at different spatial positions within the laser focus range, thus having different Rabi frequencies, resulting in different manipulation fidelities. This makes the comprehensive fidelity of qubits in the illumination range far lower than a theoretically expected value. Therefore, to implement and easily detect high-fidelity quantum state manipulation experimentally, it is also required that the optical pulse is insensitive to spatial distribution nonuniformity or instantaneous fluctuation of the laser intensity. Taking a rare-earth-ions system $Pr^{3+}:Y_2SiO_5$ with a doping concentration of 0.05% as an example, the qubits are composed of a set of ensemble Pr ions, and a center frequency of optical transition between these ensemble ions is 400 THz (605.977 nm). A full width at half maximum of an optical absorption peak is about 170 kHz, and coupling between two qubit levels $|0\rangle$ and $|1\rangle$ is implemented by optical transition between each of the qubit levels and an excited state. In such a three-level system, to quickly create an arbitrary superposition state with a high fidelity, some requirements need to be met: (1) The optical pulse can equally manipulate ensemble qubits in a frequency detuning range of ±170 kHz in a relatively short time, that is, the manipulation fidelity in this range is close to 1; (2) off-resonant excitation to other ions beyond about 3.5 MHz from the ensemble qubit ions is small enough; (3) the quantum manipulation has better robustness against instantaneous changes or nonuniform distribution of the laser intensity; and (4) during the action of the pulse, the time that the qubit ions are in the excited state is as short as possible to reduce the possibility of decoherence.

Current methods for designing optical pulses for the system may roughly fall into three categories: (1) simple resonant pulses; (2) a quantum adiabatic passage technique; and (3) a technique of shortcut to adiabaticity. The simple resonant pulses have a fast speed but are easily affected by changes in system parameters; the quantum adiabatic passage technique achieves better robustness against parameter changes, but adiabatic conditions need to be met, and thus operation duration is relatively long; the technique of shortcut to adiabaticity takes requirements for fastness and high robustness into account, and it has been proven that an inverse engineering method based on Lewis-Riesenfeld invariants can quickly create an arbitrary superposition state of qubits with a high fidelity.

Among all the works which aim for high-fidelity quantum manipulation in a three-level system, most solve the problem of the decoherence effect caused by frequency detuning. For example, in the patent entitled "OPTICAL PULSE GENERATION METHOD CAPABLE OF CREATING ARBITRARY SUPERPOSITION STATE OF QUBITS IN THREE-LEVEL SYSTEM" (CN108415206B), Yan Ying et al. proposed an optical pulse generation method for creating an arbitrary superposition state of qubits in a three-level system, which also uses an invariant theory to reversely solve a time-dependent Schrödinger equation of the three-level system, to construct a set of two-color optical pulses that can generate an arbitrary superposition state of qubits. However, this operation does not take the influence of laser intensity changes on the manipulation fidelity into account. The manipulation fidelity of qubits is not uniform within the beam focus range. Only near the center of the beam, the light intensity is almost constant in a small range where the optical power is about 6% of the total optical power, and the quantum manipulation in this range can reach a theoretically expected value. To detect information of this small number of qubits, a pinhole with a small aperture must be used in a detection system. This not only increases detection difficulties, but also reduces a signal-to-noise ratio of a detected signal.

SUMMARY

Technical problems to be solved by the present invention are as follows: A system has poor robustness against frequency detuning during action of a pulse, poor robustness of the pulse to the nonuniform distribution or instantaneous changes of a laser intensity, and higher off-resonant excitation to other ions near qubits, and the qubits are in an excited state for a long time. The present invention aims to provide a method for generating a two-color optical pulse, where the two-color optical pulse includes two pulses with equal duration and different amplitudes, frequencies and phases. The two pulses act on a three-level quantum system including two qubit levels and an excited-state level, and the quantum system can be manipulated to evolve from an initial state $|1\rangle$ to any superposition state $|\psi_{target}\rangle = \cos\theta_a |1\rangle + \sin\theta_a e^{i\varphi_a}|0\rangle$ of qubits, where $\theta_a$ and $\varphi_a$ are two angles, and $\theta_a$ is in the range of $[0, \pi]$, determining the distribution of the population at two levels: $|0\rangle$ and $|1\rangle$; and a value of $\varphi_a$ is in the range of $[0, 2\pi]$, representing a relative phase between the qubit levels $|0\rangle$ and $|1\rangle$. Under certain conditions, the generated optical pulse features the following:

(1) Pulse duration does not exceed 4 μs, and a maximum instantaneous value of Rabi frequency does not exceed 3 MHz.

(2) The fidelity of generating an arbitrary superposition state of ensemble qubits is not less than 99.7%.

(3) The optical pulse has robustness against frequency detuning in quantum systems in the range of at least ±170 kHz, and is suitable for quantum systems that need to rely on a frequency band to select qubits.

(4) Off-resonant excitation to other ions beyond 3.5 MHz from qubit ions does not exceed 6%.

(5) The optical pulse has better robustness against instantaneous changes or nonuniform distribution of the laser intensity in the range of at least ±30%.

(6) During action of the optical pulse, average time during which the qubits are in an excited state is only $1/100$ of duration of the optical pulse, which effectively reduces the possibility of decoherence and is conducive to high-fidelity manipulation.

To achieve the foregoing objective, the technical solution of the present invention is as follows:

An optical pulse design method for high-fidelity manipulation over ensemble qubits is provided, where in a three-level system, a time-dependent Schrödinger equation of the three-level system is solved inversely based on a Lewis-Riesenfeld invariant theory, a laser intensity fluctuation is taken as a perturbation, a perturbation theory is used to calculate a deviation of a quantum manipulation fidelity caused by the intensity fluctuation, and the deviation is represented by a system error sensitivity; then based on a condition that the system error sensitivity is approximately zero, amplitudes and phases of two optical pulses are designed when an initial state and a target state of the system are known, the amplitudes and the phases are input into an arbitrary waveform generator to generate radio signals with the same amplitude and phase as the optical pulses, and the radio signals are used to drive an acousto-optic modulator in a continuous laser optical path to obtain +1-order or −1-order deflection output light to generate a set of two-color optical pulses.

The system error sensitivity is a second-order differential of the fidelity to the Rabi frequency fluctuation. A system error sensitivity of zero indicates that no deviation occurs, and quantum manipulation has the strongest robustness against the laser intensity fluctuation. In this solution, during the pulse action time, quantum manipulation has stronger robustness against instantaneous changes or spatial nonuniform distribution of a laser intensity. The robustness can increase a signal-to-noise ratio of a detected signal and reduce experimental difficulties. In addition, the time that the qubits are in an excited state is significantly reduced, which can greatly reduce a decoherence effect of the qubits.

The generated two-color optical pulses are normally incident to a three-level quantum system medium, and the two-color optical pulses and the quantum system medium interact to generate an arbitrary superposition state of qubits. Compared with the prior art, the present invention remarkably features the following:

The generated two-color optical pulse is suitable for a three-level quantum system, and includes two optical pulses which act simultaneously but have different frequencies, amplitudes, and phases. The foregoing parameters of the optical pulses can be completely controlled by an arbitrary waveform generator and an acousto-optic modulator.

The two-color optical pulse can generate an arbitrary superposition state of a qubit in a three-level system, including arbitrary population distribution and arbitrary relative phase between two qubit levels.

A starting value and an end value of the two-color optical pulse may or may not be zero, and both can generate an arbitrary superposition state of the qubits.

The amplitude of the two-color optical pulse changes with time, but the frequency and the phase thereof do not change with time.

The fidelity of manipulation of the qubits by the two-color optical pulse has higher robustness against instantaneous changes or spatial nonuniform distribution of a laser intensity.

In theory, the duration of the optical pulse may be arbitrarily short, as long as the intensity of an optical field is large enough. For an optical field with a maximum Rabi frequency of 3 MHz, the duration of the optical pulse does not exceed 4 μs.

During interaction between the two-color optical pulse and the qubits, the time that qubit ions are in an excited state is only $1/100$ of duration of the optical pulse.

Figure 1:
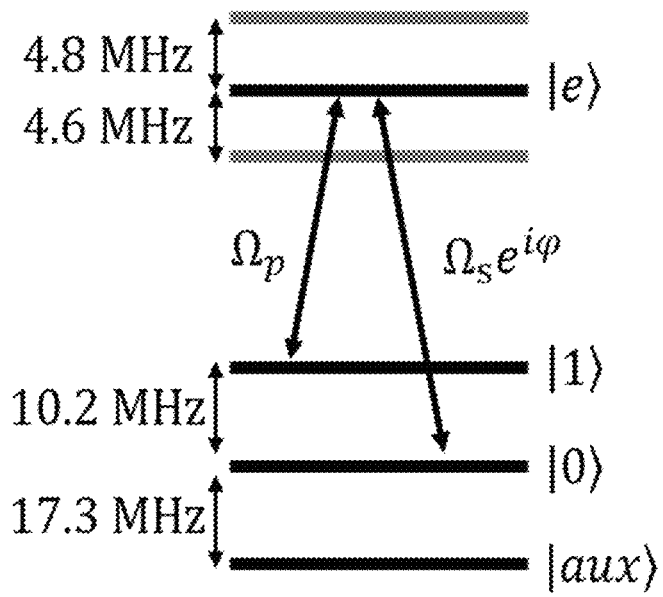
FIG. 1 is a schematic diagram of the relevant energy level structure of Pr ions randomly doped in a $Y_2SiO_5$ crystal.

In the figures, $\Omega_p$ is a Rabi frequency of optical transition from level $|1\rangle$ to level $|e\rangle$; $\Omega_s$ is a Rabi frequency of optical transition from level $|0\rangle$ to level $|e\rangle$; $\varphi$ is a phase of optical transition from the level $|0\rangle$ to the level $|e\rangle$; t is action duration of a pulse; $P_m$ is a probability that the ions are in a state of $|m\rangle$ at a time of t; m=0, 1, e; F is a fidelity of generating a target state; $\Delta$ is off-resonant frequency detuning;

$$\eta = \frac{|\Delta\Omega_{s,p}|}{\Omega_{s,p}},$$

denoting the fractional fluctuation of Rabi frequency, and $\Delta\Omega_{p,s}$ indicates a fluctuation of the Rabi frequency; $r/w_0$ denotes a ratio of a spot radius to a waist radius; and $\overline{F}$ is an effective fidelity in a limited spot range.

DESCRIPTION OF EMBODIMENTS

The present invention is further described below in conjunction with the accompanying drawings and embodiments.

Embodiment 1

An optical pulse design method for high-fidelity manipulation over ensemble qubits is provided, where an initial state $|1\rangle$ and a target state $|\psi_{target}\rangle = \cos\theta_a|1\rangle + \sin\theta_a e^{i\varphi_a}|0\rangle$ of the system are provided, where $\theta_a$ and $\varphi_a$ are two angles, $\theta_a$ is in the range of $[0, \pi]$, determining the population distribution in the two levels: $|0\rangle$ and $|1\rangle$; and $\varphi_a$, is in the range of $[0, 2\pi]$, representing a relative phase between qubit levels $|0\rangle$ and $|1\rangle$. A time-dependent Schrödinger equation of a three-level system is solved inversely by using the technique of shortcut to adiabaticity based on the Lewis-Riesenfeld invariant theory, a laser intensity fluctuation is taken as a perturbation, a perturbation theory is used to calculate a deviation of a quantum manipulation fidelity caused by the intensity fluctuation, and the deviation is represented by a second-order differential of the fidelity to the Rabi frequency fluctuation, that is, a system error sensitivity. A system error sensitivity closer to zero indicates smaller interference, and indicates stronger robustness of a quantum manipulation fidelity to the laser intensity fluctuation. Then based on a condition that the system error sensitivity is approximately zero, amplitudes and phases of two optical pulses are designed when an initial state and a target state of the system are known, the amplitudes and the phases are input into an arbitrary waveform generator to generate radio signals with the same amplitude and phase as the optical pulses, and the radio signals are used to drive an acousto-optic modulator in a continuous laser optical path to obtain +1-order or −1-order deflection output light to generate a set of two-color optical pulses, where a driving frequency of the acousto-optic modulator is $f_{aom}$, a laser frequency in the continuous laser optical path is $f_{laser}$, the qubits are represented by two levels: $|0\rangle$ and $|1\rangle$, a frequency difference therebetween is $f_{0-1}$, an optical transition frequency from the level $|1\rangle$ to a level $|e\rangle$ is $v_p$, an optical transition frequency from the level $|0\rangle$ to the level $|e\rangle$ is $v_s$, the frequency of the radio signal that drives the acousto-optic modulator to generate optical pulses acting on transition of $|1\rangle$ to $|e\rangle$ is $f_p$, the frequency of the radio signal that drives the acousto-optic modulator to generate optical pulses acting on transition of $|0\rangle$ to $|e\rangle$ is $f_s$, the two meet $f_p = f_{aom}$, and $f_s =$, $f_{aom} + f_{0-1}$; $f_{laser} + f_p = v_p$; $f_{laser} + f_s = v_s$; phases of the two radio signals are denoted as: $\varphi_p$ and $\varphi_s$, and amplitudes are denoted as $E_p$ and $E_s$; and then the following are met: $\varphi_p = 0$, $\varphi_s = \varphi_a$, $E_p$ and $E_s$ change with time, and are determined by the following relation formula:

$$E_{p,s} = -\frac{\hbar}{\mu_{p,s}} \cdot C \cdot \begin{cases} \Omega_{p,s}, & \Omega_{p,s} > 0 \\ e^{i\pi}|\Omega_{p,s}|, & \Omega_{p,s} < 0 \end{cases}, \quad (1)$$

where $\mu_{p,s}$, is a transition dipole moment of optical transition from $|1\rangle$ or $|0\rangle$ to $|e\rangle$; $\Omega_{p,s}$ is a Rabi frequency of the two optical pulses; C is a coefficient of conversion from the Rabi frequency $\Omega_{p,s}$ of the optical pulses to the amplitude $E_{p,s}$ of the radio signals, and is determined by an experimental system; the Rabi frequency $\Omega_{p,s}$ depending on a time t is denoted as the following formula:

$$\Omega_p = 2[\dot{\beta}\cot\gamma(t)\sin\beta(t) + \dot{\gamma}\cos\beta(t)] \quad (2),$$

$$\Omega_s = 2[\dot{\beta}\cot\gamma(t)\cos\beta(t) - \dot{\gamma}\sin\beta(t)] \quad (3),$$

where $\beta(t)$ and $\gamma(t)$ are two auxiliary functions; $\dot{\beta}$ and $\dot{\gamma}$ are differentials of the functions $\beta(t)$ and $\gamma(t)$ with respect to time.

In the present invention, to solve the problem that a laser intensity fluctuation reduces a quantum manipulation fidelity, a laser intensity fluctuation is taken as a perturbation, and a quantum perturbation theory is used to calculate influence of a Rabi frequency fluctuation $\eta$ of the two optical pulses on a quantum manipulation fidelity P. The following relation is provided between P and $\eta$:

$$P = |\langle\psi_{target}|\psi'(t_f)\rangle|^2 = 1 - \eta^2|\int_0^{t_f} e^{-i\alpha_+(t)}(\dot{\beta}\cos\gamma + i\dot{\gamma})dt|^2 \quad (4),$$

where P is the fidelity of the qubits reaching a target state $|\psi_{target}\rangle = \cos\theta_a|1\rangle + \sin\theta_a e^{i\varphi_a}|0\rangle$ under the action of the optical pulses when a laser intensity fluctuation exists in the system; $|\psi'(t_f)\rangle$ is a final state that the qubits can reach when a perturbation exists; $t_f$ is duration of pulses;

$$\eta = \frac{\Delta\Omega_{p,s}}{\Omega_{p,s}},$$

and $\eta \in [0, 1]$, denoting a fractional fluctuation of the Rabi frequency, $\Delta\Omega_{p,s}$ indicates a fluctuation of the respective Rabi frequency, $\Omega_{p,s}$ are Rabi frequencies, which are proportional to the square root of the laser intensity; and $$\alpha_+(t) = -\int_0^t \frac{\dot{\beta}(t\prime)}{\sin\gamma(t\prime)} dt\prime$$

is a phase factor.

A system error sensitivity $q_s$ is used to measure a deviation of the fidelity caused by the laser intensity fluctuation; a value of $q_s$ closer to zero indicates better robustness of quantum manipulation against the changes in laser intensity, and the value depends on $\beta(t)$ and $\gamma(t)$, and is determined by the following relation formula:

$$q_s = -\frac{1}{2}\frac{\partial^2 P}{\partial\eta^2}|_{\eta=0} = \left|\int_0^{t_f} e^{-i\alpha_+(t)}(\dot{\beta}\cos\gamma + i\dot{\gamma})dt\right|^2, \quad (5)$$

and it is set that $q_s \approx 0$, and based on the initial state $|1\rangle$ and the target state $|\psi_{target}\rangle = \cos\theta_a|1\rangle + \sin\theta_a e^{i\varphi_a}|0\rangle$ of qubits, $\gamma(t)$ is formed by superposition of a series of Gaussian terms:

$$\gamma(t) = \pi + \sum_{m=1}^{\infty} A_m e^{-\frac{(t-B_m t_f)^2}{(C_m t_f)^2}}, \quad (6)$$

where m is a positive integer; $A_m$ is a weight factor of each Gaussian term; $B_m$ and $C_m$ denote a pulse center and a pulse width of each Gaussian function, and $\beta(t)$ is formed by superposition of a series of sinusoidal components:

$$\beta(t) = -\frac{\theta_a}{t_f}t + \frac{\theta_a}{\pi}\sum_{n=1}^{\infty} a_n \sin\left(\frac{n\pi t}{t_f}\right) + \pi, \quad (7)$$

where $a_n$ is a coefficient of a corresponding component.

The amplitude of the two-color optical pulse generated by the foregoing technical solution includes a plurality of parameters ($A_m$, $B_m$, and $C_m$, m=1, 2, 3 ... ∞), and a plurality of degrees of freedom ($a_n$, n=1, 2, 3 ... ∞). Taking a maximum value of m as 3 and a maximum value of n as 8 as examples, feasibility of the solution is illustrated. When appropriate values of $A_m$, $B_m$ and $C_m$ are selected, the value of $a_n$ is adjusted within the range of real numbers, to generate optical pulses with different performances.

FIG. 1 is a schematic diagram of $^3H_4$-$^1D_2$ energy level structure of Pr ions randomly doped in a $Y_2SiO_5$ crystal. The structure is a typical and inhomogeneously broadened three-level system. The structure is taken as an example to explain this technical solution. A ground state and an excited state in the figure include three hyperfine levels, and an interval between the three levels is in the range of 4.6-17.3 MHz. Qubit levels include a state $|0\rangle$ and a state $|1\rangle$, and $|e\rangle$ is an excited state. Coupling between the qubit levels is implemented through optical transition of $|0\rangle$ to $|e\rangle$ and $|1\rangle$ to $|e\rangle$.

In this embodiment, a linear superposition state $$|\psi_{target}\rangle = \frac{1}{\sqrt{2}}(|1\rangle + i|0\rangle)(\theta_a = \pi/4,$$

$\varphi_a = \pi/2$) is taken as an example to illustrate a shape, a working performance, and quantum manipulation robustness of the optical pulse. At the end of the interaction between the optical pulse and the quantum system, off-resonant excitation to background ions by the optical pulse is represented by a probability $P_m$ of $|\psi(t_f)\rangle$ in the state $|1\rangle$, the state $|0\rangle$, and the state $|e\rangle$ as follows:

$$P_m = |\langle m|\psi(t_f)\rangle|^2$$

where m=0, 1, e.

Values of Gaussian parameters $A_m$, $B_m$, and $C_m$ (m=1, 2, 3) in the amplitude of the optical pulse have the following rules for the performance of the pulse: The condition of $q_s \approx 0$ requires that $A_m$ should be a constant as close to zero as possible; when $B_m$ is 0.5, off-resonant excitation can be suppressed; the value of $C_m$ should be appropriate, so that values of Gaussian terms at a start time and an end time are close to zero, to ensure that $\gamma(t)$ can meet boundary conditions at the start time and the end time. Based on the rules, the values of the selected Gaussian term parameters are shown in the following table:

|  | First Gaussian term | Second Gaussian term | Third Gaussian term |
|---|---|---|---|
| $A_m$ | 0.08 | 0.04 | 0.03 |
| $B_m$ | 0.5 | 0.5 | 0.5 |
| $C_m$ | 0.4 | 0.31 | 0.28 |

Based on these parameters, the shape, working performance and robustness of the optical pulse are simulated in MATLAB using a coupled differential equation describing interaction between light and a three-level quantum system. A fidelity F of generating the target state of qubits is defined as follows:

$$F = |\langle \psi_{target}|\psi(t_f)\rangle|^2$$

where $|\psi(t_f)\rangle$ is the quantum state $|\psi(t)\rangle$ at a time $t=t_f$ obtained by solving the three-level coupled differential equation.

Spatial distribution nonuniformity of the intensity of the optical pulse in Gaussian intensity distribution makes the fidelity of each point vary with the specific light intensity, and an effective fidelity $\bar{F}$ is used to represent the comprehensive fidelity in the range of a spot with a certain diameter. Specifically, for a Gaussian beam with a waist radius of $w_0$, in the range of a spot with a radius of r, a circle is divided into N ring along the diameter. Assuming that the rings are thin enough, so that the fidelity in each ring is constant, and assuming that the fidelity in the $i^{th}$ ring is $F(r_i)$, then the effective fidelity in this area may be defined as $$\bar{F} = \sum_{i=1}^{N} p(r_i) \cdot F(r_i)$$

where $$p(r_i) = \frac{\int_{r_{i-1}}^{r_i} \Omega(r)dr}{\int_0^r \Omega(r)dr}\left(1 \leq i \leq N, \text{ and } r_i = i\frac{r}{N}\right),$$

denoting a weight factor of the fidelity in the ring with an inner diameter of $r_{i-1}$ and an outer diameter of $r_i$, and $\Omega(r)$ is a Rabi frequency at the radius r.

Embodiment 2

In an optical pulse design method for high-fidelity manipulation over ensemble qubits based on Embodiment 1, values of all $a_n$ in formula (7) are zero. In this case:

$$\beta(t) = -\frac{\theta_a}{t_f}t + \pi.$$

Figure 2:
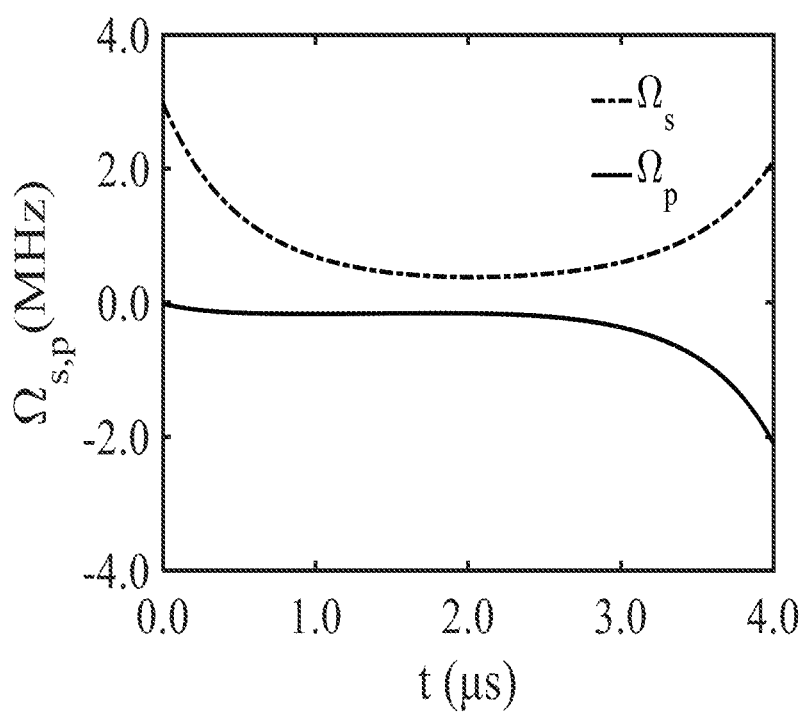
FIG. 2 is an evolution diagram of a Rabi frequency $\Omega_{p,s}$ of the two-color optical pulse with time.

$\gamma(t)$ is as shown in formula (6), and Gaussian term parameters thereof are shown in the table above. The evolution of the Rabi frequency $\Omega_{p,s}$ of the corresponding optical pulse with time is shown in FIG. 2, where a solid line is $\Omega_p$, a dotted line is $\Omega t_s$, pulse duration is 4 μs, a maximum instantaneous value of the Rabi frequency is less than 3 MHz, and values at the start time and the end time are not zero.

Figure 3:
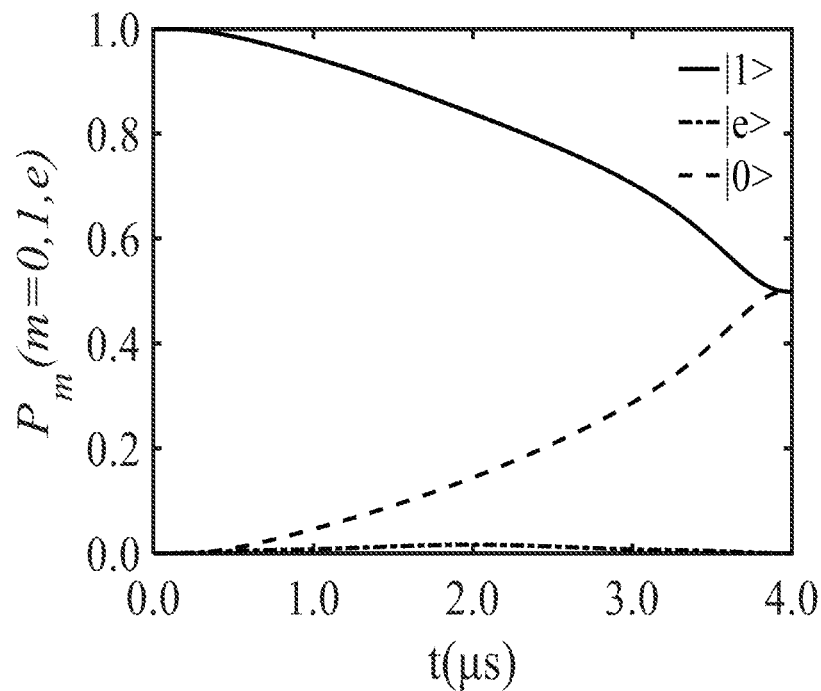
FIG. 3 is an evolution diagram of the population distribution of a non-detuned quantum system with time when an optical pulse acts on the system.

FIG. 3 shows evolution of the population of each level of a system with time under the action of this pulse when no frequency detuning occurs. All population of the quantum system start from a ground state $|1\rangle$, and are finally evenly distributed at levels $|1\rangle$ and $|0\rangle$. This is consistent with an expected initial state and target state, and there is almost no population distribution in the excited state $|e\rangle$ within pulse action duration of 4 µs.

The fidelity of creating a quantum state $|\psi_{target}\rangle$ by the optical pulse generated in this embodiment is F=0.9985, but the optical pulse is only suitable for quantum systems in the absence of frequency detuning and off-resonant excitation.

The optical pulse in this embodiment has the advantages that when the optical pulse acts on the quantum system, the average time that the population is in the excited state is only 0.04 µs, which is only 0.08% of optical transition coherence duration of 50 µs, thereby effectively reducing the possibility of decoherence. The disadvantages are that the values of the Rabi frequency are not zero at the start time and the end time. This requires a high response speed of an acousto-optic modulator, and requires that no background ions or atoms that may be excited exist near the center frequency of the qubits.

Embodiment 3

In an optical pulse design method for high-fidelity manipulation over ensemble qubits based on Embodiment 1, all even terms and odd terms of $a_n$ in formula (7) meet the following two conditions respectively:

$$a_1+3a_3+5a_5+7a_7=0,$$

$$a_2+2a_4+3a_6+4a_8 0.5.$$

Under the constraints of the conditions, in the case that $A_m$ is a constant close to zero, the values of the two-color pulse at the start time and the end time are identically equal to zero, that is, $\Omega_{p,s}(t=0, t_f)=0$. Additional degrees of freedom in $a_n$ can be arbitrarily selected in the range of real numbers, and an optical pulse is constructed under the constraints of the foregoing conditions, so that a quantum system can be quickly manipulated with a high fidelity to create a given target state $|\Omega_{target}\rangle$. Herein, taking the simplest cases $a_2=0.5$ and $a_{1,3,4,5,6,7,8}=0$ as examples, the shape and the manipulation performance of the optical pulse are explained.

Figure 4:
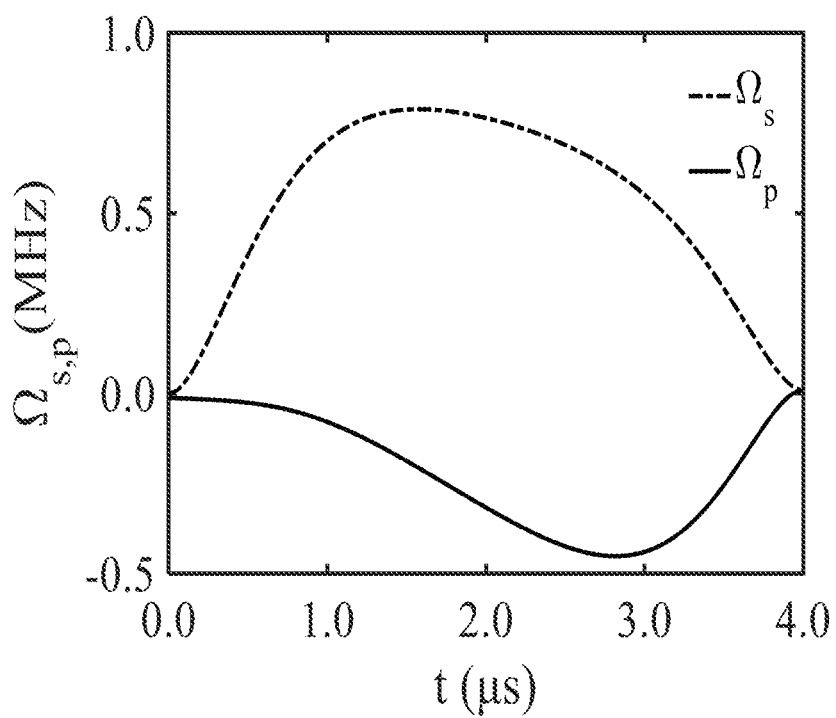
FIG. 4 is an evolution diagram of a Rabi frequency $\Omega_{p,s}$ of an optical pulse with time.

FIG. 4 is an evolution diagram of a Rabi frequency of a two-color pulse generated in this embodiment with time. Pulse duration is 4 µs, at the start time and the end time, values of a Rabi frequency values are zero, which avoids interference to quantum state manipulation by a plurality of redundant frequency components in a frequency domain caused by a sharp pulse edge, and instantaneous maximum values of the Rabi frequency do not exceed 0.8 MHz.

Figure 5:
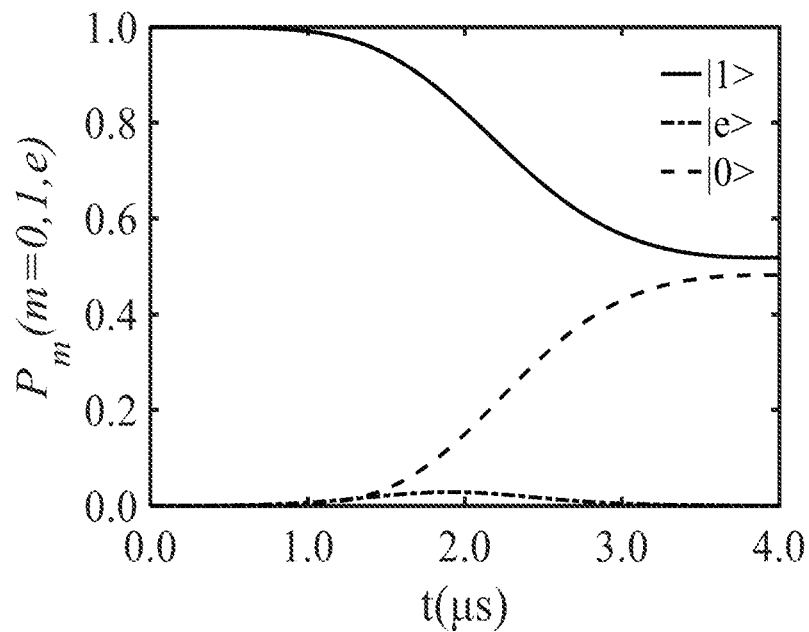
FIG. 5 is an evolution diagram of the population distribution of a non-detuned quantum system with time when an optical pulse acts on the system.

FIG. 5 is an evolution diagram of the population in each level of a non-detuned quantum system with time when an optical pulse acts on the system. Populations are all distributed at a level $|1\rangle$ at a start time, and almost evenly distributed at a level $|1\rangle$ and a level $|0\rangle$ at the end time. Although there is still a slight deviation from the ideal value of 50% required by a given target state $|\Omega_{target}\rangle$ and this is caused by the fact that a Gaussian function is not strictly zero at both ends of the pulse, it is generally consistent with the target state.

Figure 6:
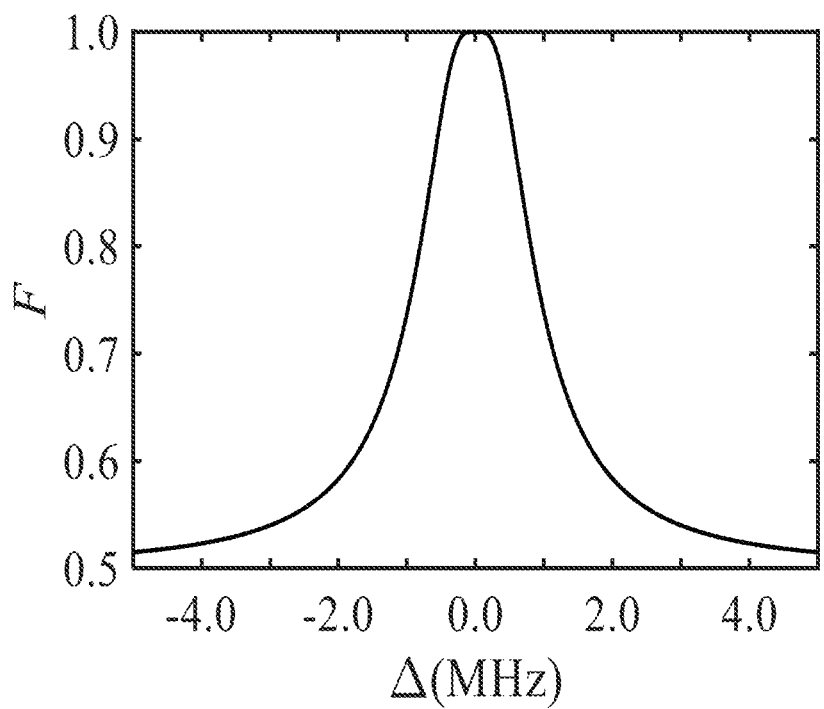
FIG. 6 is a diagram showing a dependence of a fidelity of quantum manipulation to a given target state on the frequency detuning under the action of an optical pulse.

FIG. 6 is a diagram showing a dependence of a fidelity between a final state of quantum manipulation and a given target state on the frequency detuning under the action of an optical pulse. Frequency detuning is a difference between a center frequency of the optical pulse and an actual optical transition frequency of qubit ions. In the range of ±140 kHz, the fidelity is always maintained at 99.9% or above, that is, the optical pulse has better robustness against frequency detuning in this range. Between a few hundred kHz and 3.5 MHz, no ions exist, so that the fidelity in this range is insignificant; and when the frequency detuning exceeds ±3.5 MHz, the fidelity is 50-53%, deviated from an ideal value of 50%, showing that the two-color pulse has a certain off-resonant excitation to ions in this range.

The optical pulse generated in this embodiment has the advantages that the values of the Rabi frequency at the start time and the end time are zero, which reduces requirements for a response speed of an acousto-optic modulator; the maximum instantaneous value of the Rabi frequency is less than 0.8 MHz, and energy costs are relatively low, which is a great advantage in quantum systems with limited optical power; and during the pulse action duration, the time that the population is in the excited state is only 0.04 µs, which is still far below optical transition coherence duration of 50 µs, reducing the possibility of decoherence.

Embodiment 4

In an optical pulse design method for high-fidelity manipulation over ensemble qubits based on Embodiment 1, a "fgoalattain" function in MATLAB is used to scan $a_n$, a set of optimization parameters $a_n$ that meet an optimization goal are obtained according to a relationship between a fidelity of a system reaching a given target state and changes of off-resonant excitation to background ions with frequency detuning under the action of the optical pulse, and specific examples are shown in the following table:

| $a_1$ | $a_2$ | $a_3$ | $a_4$ | $a_5$ | $a_6$ | $a_7$ | $a_8$ |
|---|---|---|---|---|---|---|---|
| 0.36 | 0.8378 | 0.04 | −0.0329 | −0.02 | −0.0639 | −0.0543 | −0.0201 |

These optimization parameters give the value of a system error sensitivity $q_s$=0.0137, which meets conditions of $q_s \approx 0$. Based on these parameters, the performance and robustness of the optical pulse are analyzed and verified.

Figure 7:
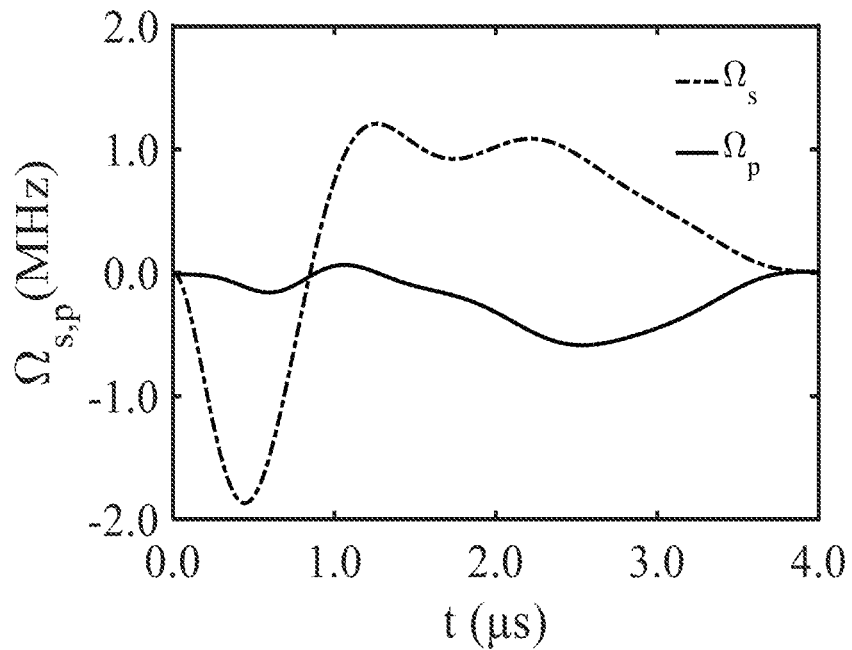
FIG. 7 is an evolution diagram of a Rabi frequency $\Omega_{p,s}$ of an optical pulse with time.

FIG. 7 is an evolution diagram of a Rabi frequency of an optical pulse in this embodiment. During pulse action duration, a maximum instantaneous value of the Rabi frequency does not exceed 2 MHz.

Figure 8:
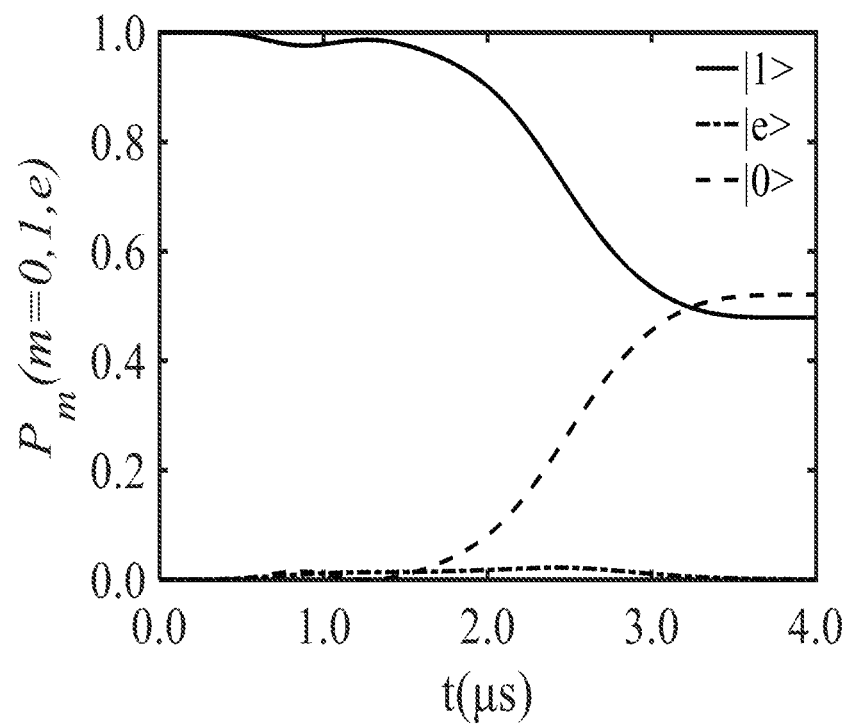
FIG. 8 is an evolution diagram of the population distribution of a non-detuned quantum system with time when an optical pulse acts on the system.

FIG. 8 is an evolution diagram of the population distribution of a non-detuned quantum system with time when an optical pulse acts on the system. At a start time, the population of a quantum state are all concentrated in a ground state $|1\rangle$, and are finally approximately evenly distributed at levels $|1\rangle$ and $|0\rangle$, but not in a state $|e\rangle$. This has a slight deviation from the population of an ideal target state, but can still ensure a relatively high fidelity.

Figure 9:
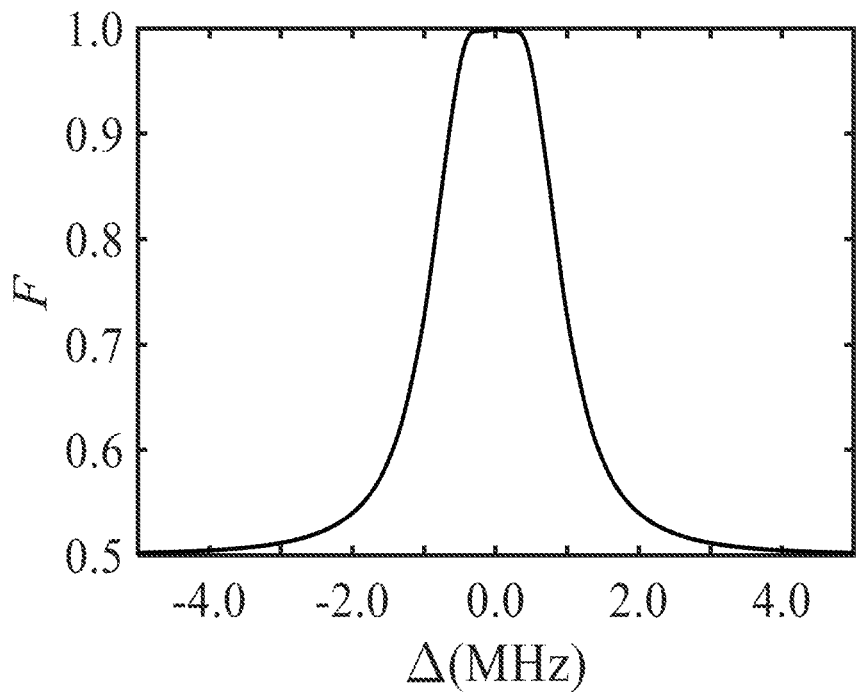
FIG. 9 is a diagram showing a dependence of a fidelity of quantum manipulation to a given target state on the frequency detuning under the action of an optical pulse.

FIG. 9 is a diagram showing a dependence of a fidelity between a final state of quantum manipulation and a given target state on the frequency detuning existing in an ensemble at an end time of an optical pulse. When the frequency detuning is zero, the fidelity is 99.9%. In the frequency detuning range of ±270 kHz, the fidelity is greater than 99.7%, which has stronger robustness. When the frequency detuning exceeds ±3.5 MHz, the fidelity is 50-51%. This figure shows that the manipulation of qubits by the optical pulse not only has better robustness against ensemble qubit ions near the center frequency, but also reduces off-resonant excitation to other ions beyond ±3.5 MHz from the qubit ions compared with that shown in FIG. 6.

Figure 10:
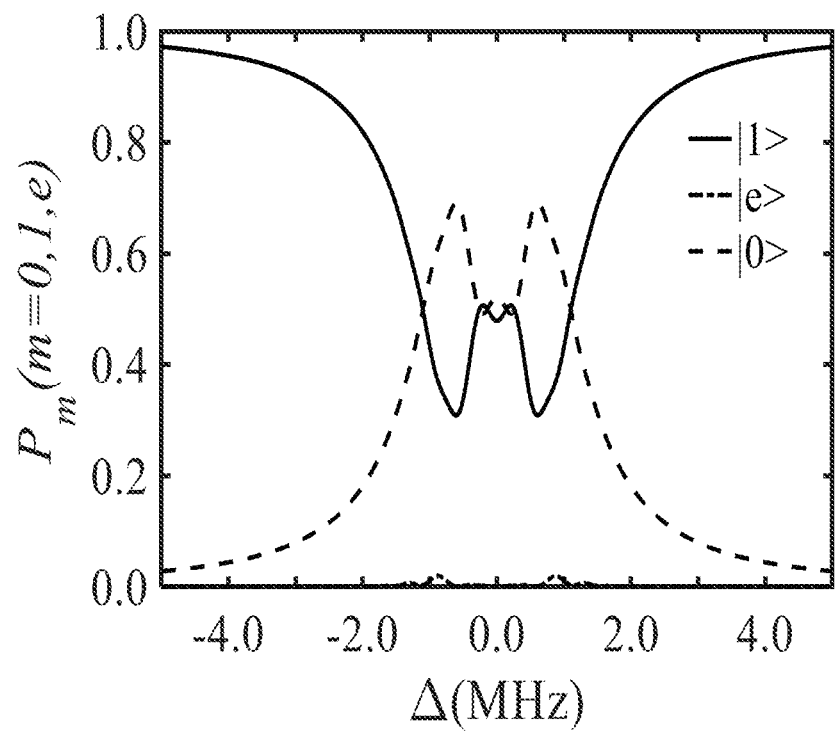
FIG. 10 is a diagram showing a dependence of the population distribution of a quantum state on frequency detuning when an optical pulse acts on the system.

FIG. 10 is a diagram showing a dependence of population at levels |1⟩, |0⟩, and |e⟩ on frequency detuning when an optical pulse acts on a three-level system. This figure can better illustrate off-resonant excitation to background ions by the optical pulse. Beyond the range of ±3.5 MHz from a center frequency in a rare-earth-ion system shown in FIG. 1, at least 94.2% of the population are still in a state |1⟩, which means that off-resonant excitation is about 5.8%. Although the off-resonant excitation still exists, it has been greatly reduced. This value is within an acceptable range for rare-earth-ion ensemble qubits, especially for ions with a relatively large level spacing, such as $Eu^{3+}$.

Figure 11:
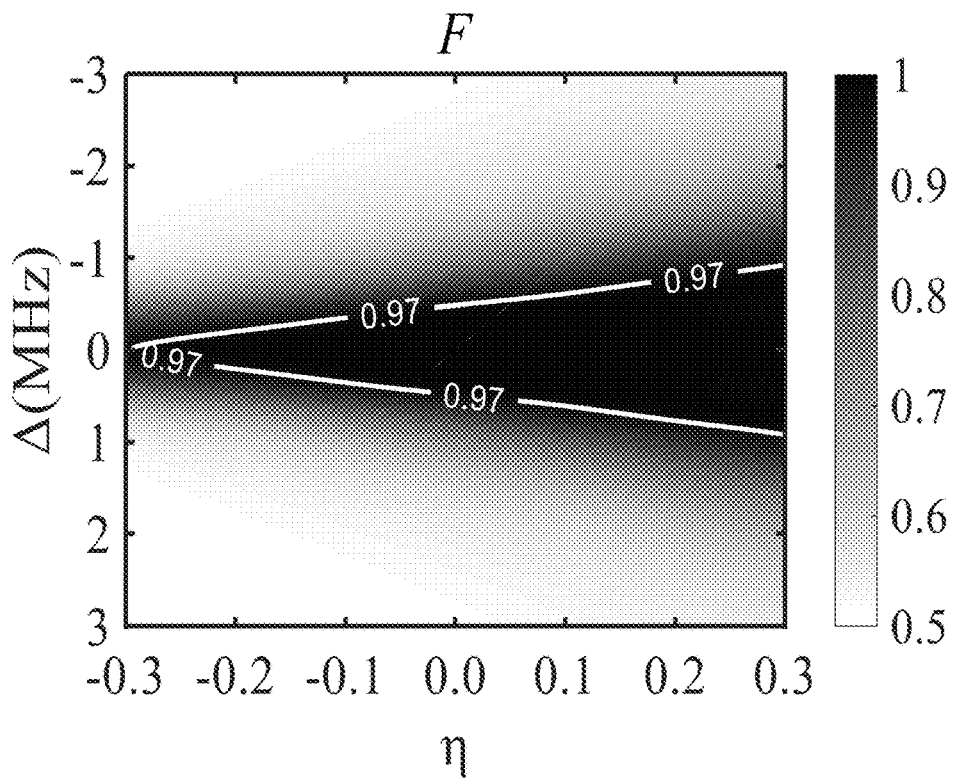
FIG. 11 is a diagram of a response of a fidelity at any point in space to frequency detuning and an instantaneous fluctuation in laser intensity.

FIG. 11 is a diagram showing changes of a fidelity of a qubit superposition state created by an optical pulse with spatial variations or instantaneous fluctuations of a laser intensity and frequency detuning. When no detuning occurs in the rare-earth-ions system shown in FIG. 1, the fidelity is always greater than 99% even if the Rabi frequency fluctuates within ±20%; and when detuning occurs, the robustness of the fidelity to a positive fluctuation of the Rabi frequency is obviously better than that to a negative fluctuation. This pulse has better robustness against the instantaneous fluctuation of the laser intensity.

Figure 12:
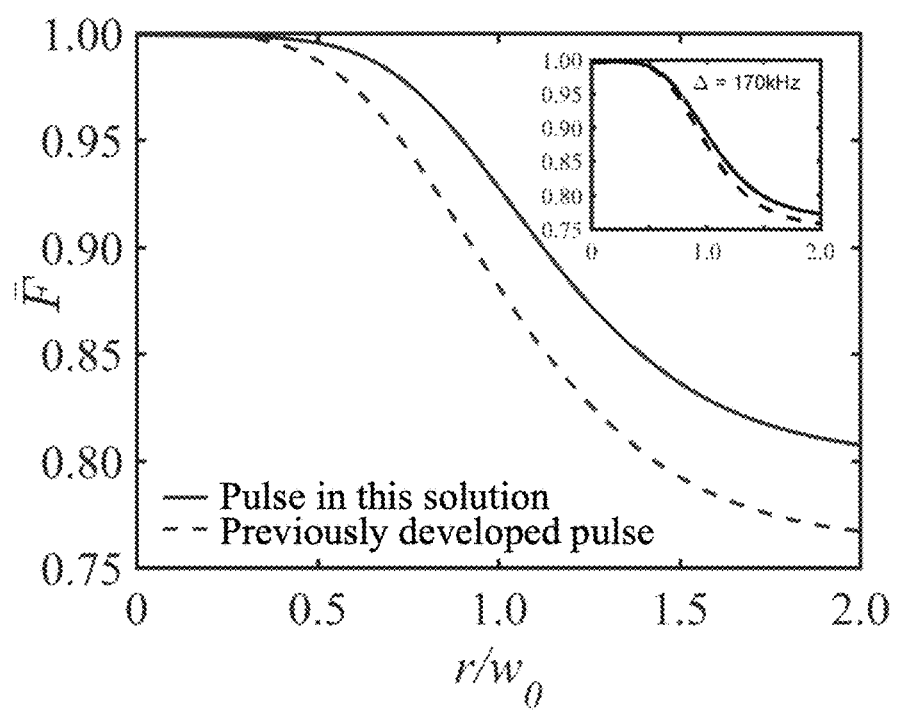
FIG. 12 is a diagram of a response of an effective fidelity $\bar{F}$ to Gaussian intensity distribution of an optical pulse within a limited spot range.

FIG. 12 is a diagram showing a dependence of an effective fidelity $\bar{F}$ on an investigated spot radius r in a limited spot range, where $w_0$ is a waist radius of a Gaussian beam. This figure can accurately illustrate robustness of $\bar{F}$ to spatial distribution nonuniformity of a laser intensity. When no frequency detuning occurs in the rare-earth-ions system shown in FIG. 1, as shown by the solid line, if a signal within a beam radius of $w_c$, is collected, optical power passing through a pinhole is 86% of the total optical power. The effective fidelity of creating a superposition state of qubits by the optical pulse in this embodiment can reach 93%, which is greater than that obtained by using an optical pulse in the patent entitled "SYSTEM CAPABLE OF CREATING ARBITRARY SUPERPOSITION STATE OF RARE-EARTH-IONS QUBITS" (CN207882951U), as shown by the dashed line. When the frequency detuning is ±170 kHz, as shown in the inset, the effective fidelity in the same spot range is 89%. A full width at half maximum of a qubit ion absorption peak generated in an experimental ensemble is 170 kHz, and thus an effective fidelity in the same spot range is about a weighted average of all effective fidelities $\bar{F}$ in the range of [−170, 170] kHz. Reducing a spot radius of the collected signal can improve the effective fidelity. If the same effective fidelity is required, for an optical pulse with higher robustness, a signal with a larger spot radius range can be collected, which is equivalent to using a pinhole with a larger aperture in a detection system. Therefore, a signal-to-noise ratio of the detected signal can be effectively increased.

Compared with that of the patent entitled "OPTICAL PULSE GENERATION METHOD CAPABLE OF CREATING ARBITRARY SUPERPOSITION STATE OF QUBITS IN THREE-LEVEL SYSTEM" (Application No. 201810234933.5), during action of the pulse in this solution, quantum manipulation has stronger robustness against instantaneous changes or spatial nonuniform distribution of a laser intensity. The robustness can increase a signal-to-noise ratio of a detected signal and reduce experimental difficulties. In addition, the time that the qubits are in an excited state is significantly reduced, which greatly reduces a decoherence effect of the qubits and ensure high-fidelity manipulation over ensemble qubits.

The optical pulse generated in this embodiment has the advantages that the optical pulse has better robustness against frequency detuning existing in an ensemble quantum system, has low enough off-resonant excitation to background ions, and is suitable for a qubit system addressed in a frequency band; the optical pulse has better robustness against nonuniform spatial distribution or instantaneous change of a laser intensity in an actual experiment; and during pulse action, the times that qubits are in the excited state is 0.04 μs, which can greatly reduce a probability of decoherence. In conclusion, the optical pulse in this embodiment takes into account the characteristics of high robustness, low resonant excitation, a high signal-to-noise ratio, and short decoherence duration, ensuring high-fidelity quantum manipulation.

Embodiment 5

Based on Embodiment 4, a new optical pulse is investigated to drive qubits of a three-level system to evolve from an arbitrary superposition state $|\psi_{in}\rangle = \cos\theta_a|1\rangle + \sin\theta_a e^{i\varphi_a}|0\rangle$ to a state |1⟩. The method is to invert qubit manipulation by the optical pulse with time, and a time t needs to be changed to $t_f-t$, where $t_f$ is duration of the pulse; a Rabi frequency $\Omega_{p,s}$ needs to be changed to $-\Omega_{p,s}$, that is:

$$t \to t_f - t, \psi_{p,s} \to -\psi_{p,s}$$

Other parameters are fixed, so that a new set of two-color optical pulses is generated. A shape, a performance, and manipulation robustness of an optical pulse will be explained below by taking $$|\psi_{in}\rangle = \frac{1}{\sqrt{2}}(|1\rangle + i|0\rangle)$$

as an example.

Figure 13:
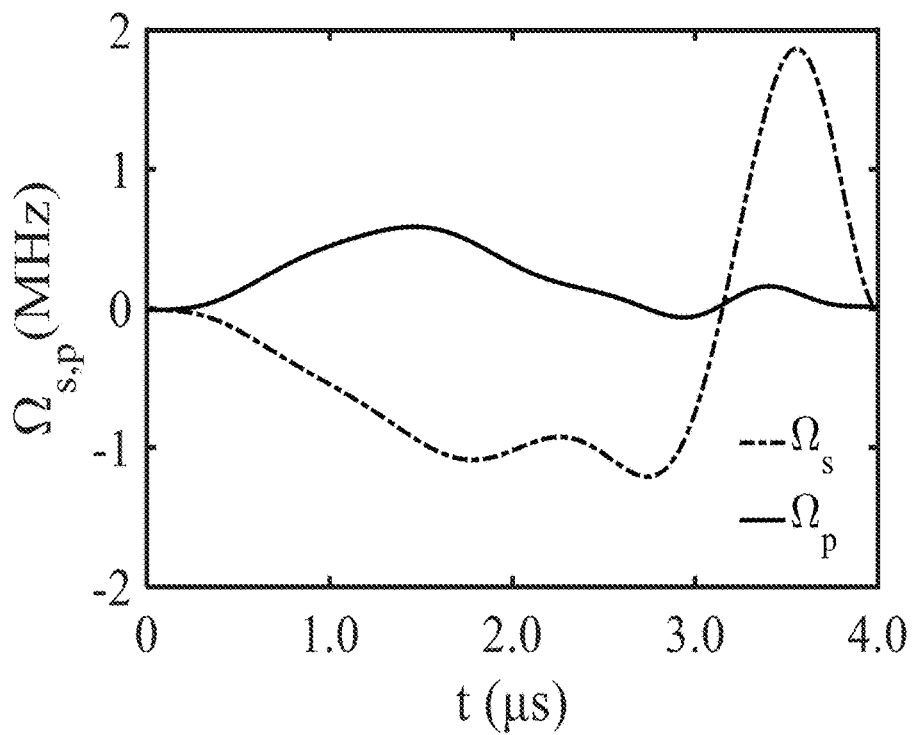
FIG. 13 is an evolution diagram of a Rabi frequency $\Omega_{p,s}$ of an optical pulse with time.

FIG. 13 is an evolution diagram of a Rabi frequency of an optical pulse in this embodiment with time. Compared with those in FIG. 7, changes in this figure are time-reversed, and values are opposite.

Figure 14:
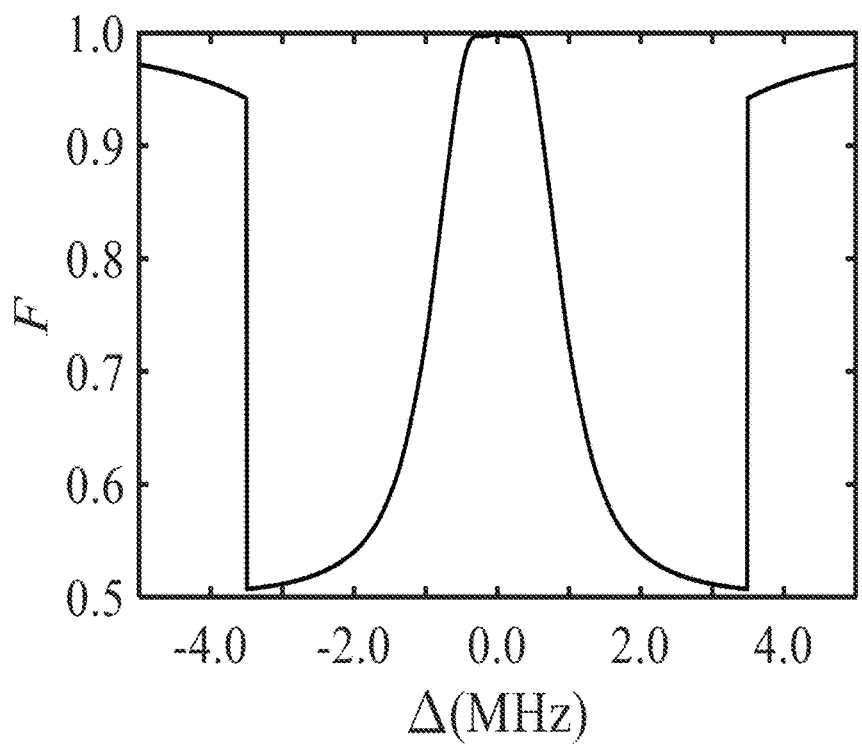
FIG. 14 is a diagram showing a dependence of a fidelity of a given target state on frequency detuning under the action of an optical pulse.

FIG. 14 is a diagram showing a dependence of a fidelity of quantum manipulation from an initial state to a given target state on frequency detuning at an end time of an optical pulse. An initial state of qubit ions is different from that of background ions. A transition frequency of the qubit ions is within hundreds of kHz. The initial state is a superposition state $|\psi_{in}\rangle$, and a goal of quantum manipulation is to transfer the qubit ions to a quantum state |1⟩. Between hundreds of kHz and 3.5 MHz, no ions exist, and thus behavior in this range is insignificant. The initial state of background ions in the range of $|\Delta|\geq 3.5$ MHz is |1⟩, and the quantum manipulation of qubits should avoid exciting these background ions to the largest extent, that is, the initial state of the background ions should be kept unchanged. It can be learned from the figure that the fidelity of quantum manipulation is 99.9% when no frequency detuning occurs; in the frequency detuning range of $|\Delta|\leq 270$ kHz, the fidelity of the manipulation is greater than 99.7%, indicating that the quantum manipulation has stronger robustness against the frequency detuning in this range; and when the frequency detuning is equal to ±3.5 MHz, the fidelity of keeping the background ions in their initial state |1⟩ is about 95%, indicating that a small amount of off-resonant excitation exists.

Figure 15:
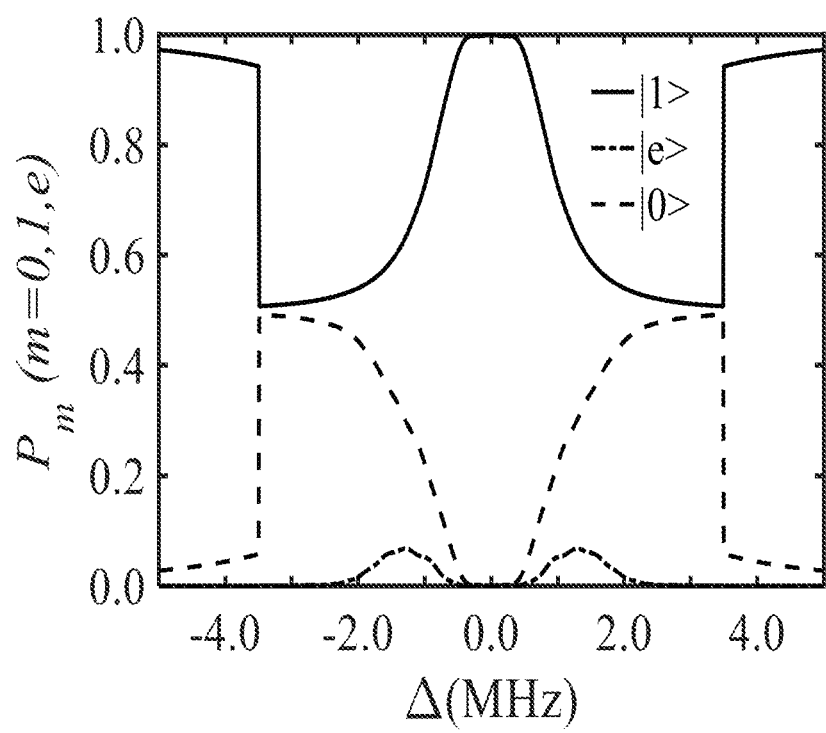
FIG. 15 is a diagram showing a dependence of the population distribution of a quantum state on frequency detuning when an optical pulse acts on the system.

FIG. 15 is a diagram showing a dependence of distribution of the population at levels |1⟩, |0⟩, and |e⟩ on frequency detuning when an optical pulse acts on a three-level system. This figure can clearly illustrate off-resonant excitation to background ions. At a distance of 3.5 MHz from a center frequency of qubits, there is no population distribution in a state |e⟩, while about 5.8% of background ions are excited from an initial state |1⟩ to a state |0⟩ by an optical pulse in an off-resonant manner. This value is acceptable for the rare-earth-ions system shown in FIG. 1.

The advantages of the optical pulse generated in this embodiment are the same as those of Embodiment 4, except in that this optical pulse is mainly used to transfer an arbitrary superposition state of a qubit to a single state in a three-level system.

On the basis of solving the decoherence problem caused by frequency detuning, the present invention further solves the problem of reduction of a fidelity caused by changes of a laser intensity, and the optical pulse which solves these two problems has a better application prospect. In addition, the two-color optical pulse generated by the foregoing technical solution can be used to make a quantum computer or a quantum memory based on rare-earth-ions, and components of these two devices include: a quantum system doped with rare-earth-ions, a 2K cryostat which provides a low-temperature environment for the quantum system to maintain long coherence time thereof, and a laser with continuous laser output. An optical pulse generation system includes an arbitrary waveform generator, an acousto-optic modulator, and some common optical components such as a mirror, a lens, a wave plate, and a polarizer. It should be noted that although this technical solution is developed for a three-level system, under certain conditions, the three-level system can be collapsed into a two-level system, so as to construct an optical pulse which can transfer the population of the two-level system and create a superposition state. These minor technical variations or modifications still fall within the scope covered by the present invention.

The part of this technical solution that is not described in detail falls within a conventional technology for a person skilled in the art.

What is claimed is:

1. An optical pulse design method for high-fidelity manipulation over ensemble qubits, comprising:
   solving a time-dependent Schrödinger equation of a three-level system inversely based on a Lewis-Riesenfeld invariant theory;
   taking a laser intensity fluctuation as a perturbation;
   using a perturbation theory to calculate a deviation of a quantum manipulation fidelity caused by the laser intensity fluctuation, the deviation being represented by a system error sensitivity;
   designing amplitudes and phases of two optical pulses when an initial state and a target state of the three-level system are known based on a condition that the system error sensitivity is approximately zero;
   inputting the amplitudes and the phases into an arbitrary waveform generator to generate radio signals with the same amplitude and phase as the two optical pulses;
   using the radio signals to drive an acousto-optic modulator in a continuous laser optical path to obtain +1-order or −1-order deflection output light to generate a set of two-color optical pulses, the set of two-color optical pulses being normally incident to a three-level quantum system medium; and
   interacting the set of two-color optical pulses and the three-level quantum system medium to generate an arbitrary superposition state of qubits,
   wherein the initial state |1⟩ and the target state |ψtarget⟩=cos θ$_a$|1⟩+sin θ$_a$e$^{iφ_a}$|0⟩ of the system are provided, wherein θ$_a$ and φ$_a$ are two angles, and θ$_a$ is in the range of [0, π], representing distribution of the population at two levels: |0⟩ and |1⟩; a value of φ$_a$ is in the range of [0, 2π], representing a relative phase between the qubit levels |0⟩ and |1⟩;
   wherein a driving frequency of the acousto-optic modulator is f$_{aom}$, a laser frequency in the continuous laser optical path is f$_{laser}$, the qubits are represented by two levels: |0⟩ and |1⟩, a frequency difference therebetween is f$_{0-1}$, an optical transition frequency between the level |1⟩ and a level |e⟩ is v$_p$, an optical transition frequency between the level |0⟩ and the level |e⟩ is v$_s$, a frequency of a radio signal that drives the acousto-optic modulator to generate optical pulses acting on transition of |1⟩ to |e⟩ is f$_p$, a frequency of a radio signal that drives the acousto-optic modulator to generate optical pulses acting on transition of |0⟩ to |e⟩ is f$_s$, the two meet f$_p$=f$_{aom}$, and f$_s$=f$_{aom}$+f$_{0-1}$, f$_{laser}$+f$_p$=v$_p$; f$_{laser}$+f$_s$=v$_s$; phases of the two radio signals are denoted as: φ$_p$ and φ$_s$, and amplitudes are denoted as E$_p$ and E$_s$; then the following are met: φ$_p$=0, φ$_s$=φ$_a$, E$_p$ and E$_s$ change with time, and are determined by the following relation formula:

$$E_{p,s} = -\frac{\hbar}{\mu_{p,s}} \cdot C \cdot \begin{cases} \Omega_{p,s}, & \Omega_{p,s} > 0 \\ e^{i\pi}|\Omega_{p,s}|, & \Omega_{p,s} < 0 \end{cases}, \quad (1)$$

wherein μ$_{p,s}$ is a transition dipole moment of optical transition of |1⟩ to |e⟩ and |0⟩ to |e⟩; Ω$_{p,s}$ is a Rabi frequency of the two optical pulses; C is a coefficient of conversion from the Rabi frequency Ω$_{p,s}$ of the optical pulses to the amplitude E$_{p,s}$ of the radio signals, and is determined by an experimental system; the Rabi frequency Ω$_{p,s}$ depending on a time t is denoted as the following formula:

$$\Omega_p = 2[\dot{\beta} \cot \gamma(t) \sin \beta(t) + \dot{\gamma} \cos \beta(t)] \quad (2),$$

$$\Omega_s = 2[\dot{\beta} \cot \gamma(t) \cos \beta(t) - \dot{\gamma} \sin \beta(t)] \quad (3),$$

wherein β(t) and γ(t) are functions that depend on time; $\dot{\beta}$ and $\dot{\gamma}$ are differentials of the functions β(t) and γ(t) with respect to the time;
a laser intensity fluctuation is taken as a perturbation, and a quantum perturbation theory is used to calculate an influence of a Rabi frequency fluctuation η of the two optical pulses on a quantum manipulation fidelity P, wherein the following relation is provided between P and η:

$$P=|⟨\psi_{target}|\psi'(t_f)⟩|^2=1-η^2|\int_0^{t_f} e^{-iα_+(t)}(\dot{\beta} \cos \gamma+i\dot{\gamma})dt|^2 \quad (4),$$

wherein P is a fidelity of the qubits reaching a target state |ψ$_{target}$⟩=cos θ$_a$|1⟩+sin θ$_a$e$^{iφ_a}$|0⟩ under the action of the optical pulses when a laser intensity fluctuation exists in the system;

$$|\psi'(t_f)⟩$$

is a final state that the qubits can reach when a perturbation exists; t$_f$ is duration system; of pulses;

$$\eta = \frac{\Delta\Omega_{p,s}}{\Omega_{p,s}},$$

and $\eta \in [0, 1]$, denoting a fractional fluctuation of Rabi frequency, and $\Delta\Omega_{p,s}$ is a fluctuation quantity of the Rabi frequency; $\Omega_{p,s}$ is a Rabi frequency, which is proportional to the square root of the laser intensity;

$$\alpha_+(t) = -\int_0^{\tau} \frac{\dot{\beta}(t')}{\sin\gamma(t')} dt'$$

is a phase factor depending on $\beta(t)$ and $\gamma(t)$;

a system error sensitivity $q_s$ is used to measure a deviation of the fidelity caused by the Rabi frequency fluctuation; a value of $q_s$ closer to zero indicates a smaller deviation and indicates better robustness of quantum manipulation to laser intensity changes, and the value depends on $\beta(t)$ and $\gamma(t)$, and is determined by the following relation formula:

$$q_s = -\frac{1}{2}\frac{\partial^2 P}{\partial \eta^2}\bigg|_{\eta=0} = \left|\int_0^{t_f} e^{-i\alpha_+(t)}(\dot{\beta}\cos\gamma + i\dot{\gamma})dt\right|^2, \quad (5)$$

and it is set that $q_s \approx 0$, and based on the initial state $|1\rangle$ and the target state $|\psi_{target}\rangle = \cos\theta_a|1\rangle + \sin\theta_a e^{i\varphi_a}|0\rangle$ of qubits, $\gamma(t)$ is formed by superposition of a series of Gaussian terms:

$$\gamma(t) = \pi + \sum_{m=1}^{\infty} A_m e^{-\frac{(t-B_m t_f)^2}{(C_m t_f)^2}}, \quad (6)$$

wherein m is a positive integer; $A_m$ is a weight factor of each Gaussian term; $B_m$ and $C_m$ denote a center and a width of each Gaussian function respectively; and $\beta(t)$ is formed by superposition of a series of sinusoidal components:

$$\beta(t) = -\frac{\theta_a}{t_f}t + \frac{\theta_a}{\pi}\sum_{n=1}^{\infty} a_n \sin\left(\frac{n\pi t}{t_f}\right) + \pi, \quad (7)$$

wherein $a_n$ is a coefficient of each sinusoidal component.

2. The optical pulse design method for high-fidelity manipulation over ensemble qubits according to claim 1, wherein values of all $a_n$ in formula (7) are zeros.

3. The optical pulse design method for high-fidelity manipulation over ensemble qubits according to claim 1, wherein all even terms and odd terms of $a_n$ in formula (7) meet the following conditions respectively:

$$a_1 + 3a_3 + 5a_5 + 7a_7 = 0,$$

$$a_2 + 2a_4 + 3a_6 + 4a_8 = 0.5.$$

4. The optical pulse design method for high-fidelity manipulation over ensemble qubits according to claim 1, wherein by scanning the value of $a_n$, the fidelity of the target state generated and a situation of off-resonant excitation to background ions are detected at a termination time of interaction between the optical pulses and the quantum system are detected, to obtain an optimal value of $a_n$ in formula (7).

5. The optical pulse design method for high-fidelity manipulation over ensemble qubits according to claim 4, wherein $a_n$ has the following optimal values:

| $a_1$ | $a_2$ | $a_3$ | $a_4$ | $a_5$ | $a_6$ | $a_7$ | $a_8$ |
|---|---|---|---|---|---|---|---|
| 0.36 | 0.8378 | 0.04 | −0.0329 | −0.02 | −0.0639 | −0.0543 | −0.0201. |

6. A rare-earth-ions quantum device made by generating optical pulses by using the method according to claim 1.

\* \* \* \* \*